United States Patent
de Léon et al.

(10) Patent No.: US 8,000,742 B2
(45) Date of Patent: Aug. 16, 2011

(54) MOBILE WIRELESS COMMUNICATION TERMINALS, SYSTEMS, METHODS, AND COMPUTER PROGRAM PRODUCTS FOR MANAGING PLAYBACK OF SONG FILES

(75) Inventors: David de Léon, Lund (SE); Erik Sparre, Lomma (SE); Martin Granström, Malmö (SE)

(73) Assignee: Sony Ericsson Mobile Communications AB, Lund (SE)

( * ) Notice: Subject to any disclaimer, the term of this patent is extended or adjusted under 35 U.S.C. 154(b) by 227 days.

(21) Appl. No.: 12/433,071

(22) Filed: Apr. 30, 2009

(65) Prior Publication Data

US 2009/0215435 A1    Aug. 27, 2009

Related U.S. Application Data

(62) Division of application No. 11/435,023, filed on May 16, 2006, now Pat. No. 7,546,144.

(51) Int. Cl.
*H04B 1/38* (2006.01)
(52) U.S. Cl. .................. 455/557; 455/414.1; 455/556.1; 455/556.2
(58) Field of Classification Search .............. 455/414.1, 455/557, 556.1, 426
See application file for complete search history.

(56) References Cited

U.S. PATENT DOCUMENTS

| | | | |
|---|---|---|---|
| 6,424,820 | B1 | 7/2002 | Burdick et al. |
| 2001/0018858 | A1 | 9/2001 | Dwek |
| 2001/0038702 | A1 | 11/2001 | Lavoie et al. |
| 2002/0168938 | A1 | 11/2002 | Chang |
| 2003/0012389 | A1 | 1/2003 | Brice et al. |
| 2003/0032419 | A1 | 2/2003 | Shibasaki et al. |
| 2003/0037157 | A1 | 2/2003 | Pestoni et al. |
| 2003/0050058 | A1 | 3/2003 | Walsh et al. |
| 2003/0227478 | A1 | 12/2003 | Chatfield |
| 2004/0010467 | A1 | 1/2004 | Hori et al. |
| 2004/0014426 | A1 | 1/2004 | Moore |
| 2004/0136338 | A1 | 7/2004 | Lin et al. |
| 2004/0259581 | A1 | 12/2004 | Crisler et al. |
| 2005/0107073 | A1 | 5/2005 | Cheiky et al. |
| 2005/0160270 | A1 | 7/2005 | Goldberg et al. |
| 2006/0008256 | A1 | 1/2006 | Khedouri et al. |
| 2006/0041943 | A1 | 2/2006 | Singer et al. |

(Continued)

FOREIGN PATENT DOCUMENTS

EP    1 478 134 A1    11/2004

(Continued)

OTHER PUBLICATIONS

*Sony Ericsson unveils the Bluetooth Media Viewer MMV100 printer friendly*, http://www.pocket-lint.co.uk/printnews.php?newsId=238, 1 page, dated Jul. 11, 2005.

(Continued)

*Primary Examiner* — David Q Nguyen
(74) *Attorney, Agent, or Firm* — Myers Bigel Sibley & Sajovec, PA

(57) ABSTRACT

A mobile wireless communication terminal includes a wireless communication module that is configured to communicate with other communication terminals over a wireless interface, and a controller. The controller is configured to establish a connection with at least one participant wireless communication terminal via the wireless communication module, to receive from the at least one participant wireless communication terminal an identification of a compliant song file stored on the at least one participant wireless communication terminal and having a metadata tag associated therewith indicating that the compliant song file is classified in a prescribed song file category, and to execute playback of the compliant song file.

18 Claims, 7 Drawing Sheets

U.S. PATENT DOCUMENTS

| | | |
|---|---|---|
| 2006/0265349 A1 | 11/2006 | Hicken |
| 2006/0268763 A1 | 11/2006 | George |
| 2009/0029685 A1 | 1/2009 | Willis |

FOREIGN PATENT DOCUMENTS

| | | |
|---|---|---|
| EP | 1 615 464 A1 | 1/2006 |
| JP | 2004-348143 | 12/2004 |
| WO | WO 2004/023841 A | 3/2004 |
| WO | WO 2004/075169 A2 | 9/2004 |
| WO | WO 2005/112422 A1 | 11/2005 |

OTHER PUBLICATIONS

*MMS—Share the good times*, http://www.ericsson.com/mms/, 3 pages, dated Jul. 11, 2005.

*Trust-Bluetooth information*, http://www.trust.com/service/help/bluetooth/default.aspx, 12 pages, dated Jul. 11, 2005.

Jones et al., "Emerging Technologies," Language Learning and Technology, Jan. 2002, vol. 6 (1), pp. 6-10.

*Bluetooth Media Center MMV-200*, http://www.sonyericsson.com/spg.jsp?cc=us&lc=en&ver=4000&template=pp4_1_1&zone..., 2 pages, dated Jun. 16, 2006.

*Bluetooth Media Center MMV-200*, http://www.sonyericsson.com/spg.jsp?cc=us&lc=en&ver=40000&page=php1_10252&pid=..., 2 pages, dated Jun. 16, 2006.

*Sony Ericsson Bluetooth Media Center MMV-200*, http://www.mobiletechnews.com/info/2005/03/02/021650.html, 1 page, dated Jun. 16, 2006.

Invitation to Pay Additional Fees for PCT/EP2006/067942 mailed Feb. 8, 2007, 7 pages.

Written Opinion of the International Searching Authority for PCT Application No. PCT/EP2006/067942, mailed Apr. 26, 2007.

Invitation to Restrict or Pay Additional Fees, and, Where Applicable, Protest Fee (4 pages) corresponding to International Application No. PCT/EP2006/067942; Mailing Date: Jul. 25, 2008.

First Office Action received for corresponding Japanese Patent Application No. 2009-510289 dated May 23, 2011 (2 pages).

MOBILE WIRELESS COMMUNICATION TERMINALS, SYSTEMS, METHODS, AND COMPUTER PROGRAM PRODUCTS FOR MANAGING PLAYBACK OF SONG FILES

RELATED APPLICATION

The present application is a divisional application of and claims priority from U.S. patent application Ser. No. 11/435,023, filed May 16, 2006 now U.S. Pat. No. 7,546,144, the disclosure of which is incorporated herein by reference in its entirety.

FIELD OF THE INVENTION

The present invention relates to electronic devices and, more particularly, to electronic devices, methods and computer program products for playing song files.

BACKGROUND OF THE INVENTION

Mobile electronic devices, such as wireless communication terminals (e.g., cellular telephones), are widely used to store and playback song files. A user may wish to play a song file on another device such as a media center (e.g., a PC or laptop, a television, an audio receiver, etc.) or another wireless communication terminal. This may be accomplished by connecting the electronic device to the other device via a cable or a wireless link (e.g., a Bluetooth connection) if the other device is equipped with a suitable communication module, which may be an integrated module or an auxiliary (e.g., plug-in) module. Song files may be sent, one by one, from one or more mobile electronic devices to the playback device(s).

SUMMARY OF THE INVENTION

According to some embodiments of the present invention, a mobile wireless communication terminal includes a wireless communication module that is configured to communicate with other communication terminals over a wireless interface, and a controller. The controller is configured to establish a connection with at least one participant wireless communication terminal via the wireless communication module, to receive from the at least one participant wireless communication terminal an identification of a compliant song file stored on the at least one participant wireless communication terminal and having a metadata tag associated therewith indicating that the compliant song file is classified in a prescribed song file category, and to execute playback of the compliant song file.

The controller may be configured to establish a connection with a plurality of participant wireless communication terminals via the wireless communication module, and to receive identifications of compliant songs from at least two of the plurality of participant wireless communication terminals.

According to some embodiments, the controller is configured to establish a connection with a plurality of participant wireless communication terminals via the wireless communication module, and to execute playback of the compliant song file simultaneously on the plurality of participant wireless communication terminals.

The controller may be configured to retrieve the compliant song file from the at least one participant wireless communication terminal for playback.

According to some embodiments of the present invention, the wireless communication module is configured to communicate with other communication terminals over a direct point-to-point wireless interface, and the controller is configured to establish the connection with the at least one participant wireless communication terminal via the wireless communication module via the direct point-to-point wireless interface, and to receive the identification of a compliant song file from the at least one participant wireless communication terminal via the direct point-to-point wireless interface. The wireless communication module may comprise a Bluetooth transmitter. The wireless communication terminal may include a cellular telephone.

According to further embodiments of the present invention, a mobile wireless communication terminal includes a wireless communication module that is configured to communicate with other communication terminals over a wireless interface, and a controller. The controller is configured to establish a connection with at least one participant wireless communication terminal via the wireless communication module, to maintain a list of nominated song files, to receive at least one vote message from the at least one participant wireless communication terminal, to determine an elected song file from the list of nominated song files based on the at least one vote message, and to execute playback of the elected song file.

According to some embodiments, the controller is configured to receive an identification of a nominated song file from the at least one participant wireless communication terminal, and to add the identification of the nominated song file to the list of nominated song files.

According to some embodiments, the controller is configured to establish a connection with a plurality of participant wireless communication terminals via the wireless communication module, and to receive vote messages from at least two of the plurality of participant wireless communication terminals.

The controller may be configured to establish a connection with a plurality of participant wireless communication terminals via the wireless communication module, and to execute playback of the elected song file simultaneously on the plurality of participant wireless communication terminals.

The controller may be configured to retrieve the elected song file from the at least one participant wireless communication terminal for playback.

According to some embodiments of the present invention, the wireless communication module is configured to communicate with other communication terminals over a direct point-to-point wireless interface, and the controller is configured to establish the connection with the at least one participant wireless communication terminal via the wireless communication module via the direct point-to-point wireless interface, and to receive the at least one vote message from the at least one participant wireless communication terminal via the direct point-to-point wireless interface. The wireless communication module may comprise a Bluetooth transmitter. The wireless communication terminal may include a cellular telephone.

According to further embodiments of the present invention, a mobile wireless communication terminal includes a wireless communication module that is configured to communicate with other communication terminals over a wireless interface, and a controller. The controller is configured to establish a connection with at least one participant wireless communication terminal via the wireless communication module, and to send at least one light effect signal to the at least one participant wireless communication terminal instnicting the at least one participant wireless communication terminal to control at least one lighting device of the at least one participant wireless communication terminal in correspondence with playback of a song file.

According to some embodiments, the controller is configured to establish a connection with a plurality of participant wireless communication terminals via the wireless communication module, and to send light effect signals to each of the plurality of participant wireless communication terminals instructing each of the plurality of participant wireless communication terminals to control a lighting device thereof in correspondence with playback of the song file.

According to some embodiments, the controller may be configured to send light effect signals to each of the plurality of participant wireless communication terminals instructing the plurality of participant wireless communication terminals to control the lighting devices thereof differently from one another.

The controller may be configured to send light effect signals to each of the plurality of participant wireless communication terminals so as to cause the plurality of participant wireless communication terminals to display on respective displays thereof an image that moves over time from the display of a first of the plurality of participant wireless communication terminals to the display of a second of the plurality of participant wireless communication terminals.

According to some embodiments, the controller is configured to send light effect signals to each of the plurality of participant wireless communication terminals so as to cause a lighting device of a first of the plurality of participant wireless communication terminals to respond to audio signals in a first audio frequency range and to cause a lighting device of a second of the plurality of participant wireless communication terminals to respond to audio signals in a second audio frequency range different from the first audio frequency range.

The controller may be configured to execute playback of the song file simultaneously on the plurality of participant wireless communication terminals.

According to some embodiments, the wireless communication module is configured to communicate with other communication terminals over a direct point-to-point wireless interface, and the controller is configured to establish the connection with the at least one participant wireless communication terminal via the wireless communication module via the direct point-to-point wireless interface, and to send the at least one light effect signal to the at least one participant wireless communication terminal via the direct point-to-point wireless interface. The wireless communication module may comprise a Bluetooth transmitter. The wireless communication terminal may include a cellular telephone.

Further features, advantages and details of the present invention will be appreciated by those of ordinary skill in the art from a reading of the figures and the detailed description of the preferred embodiments that follow, such description being merely illustrative of the present invention.

DETAILED DESCRIPTION OF EMBODIMENTS OF THE INVENTION

Figure 1:
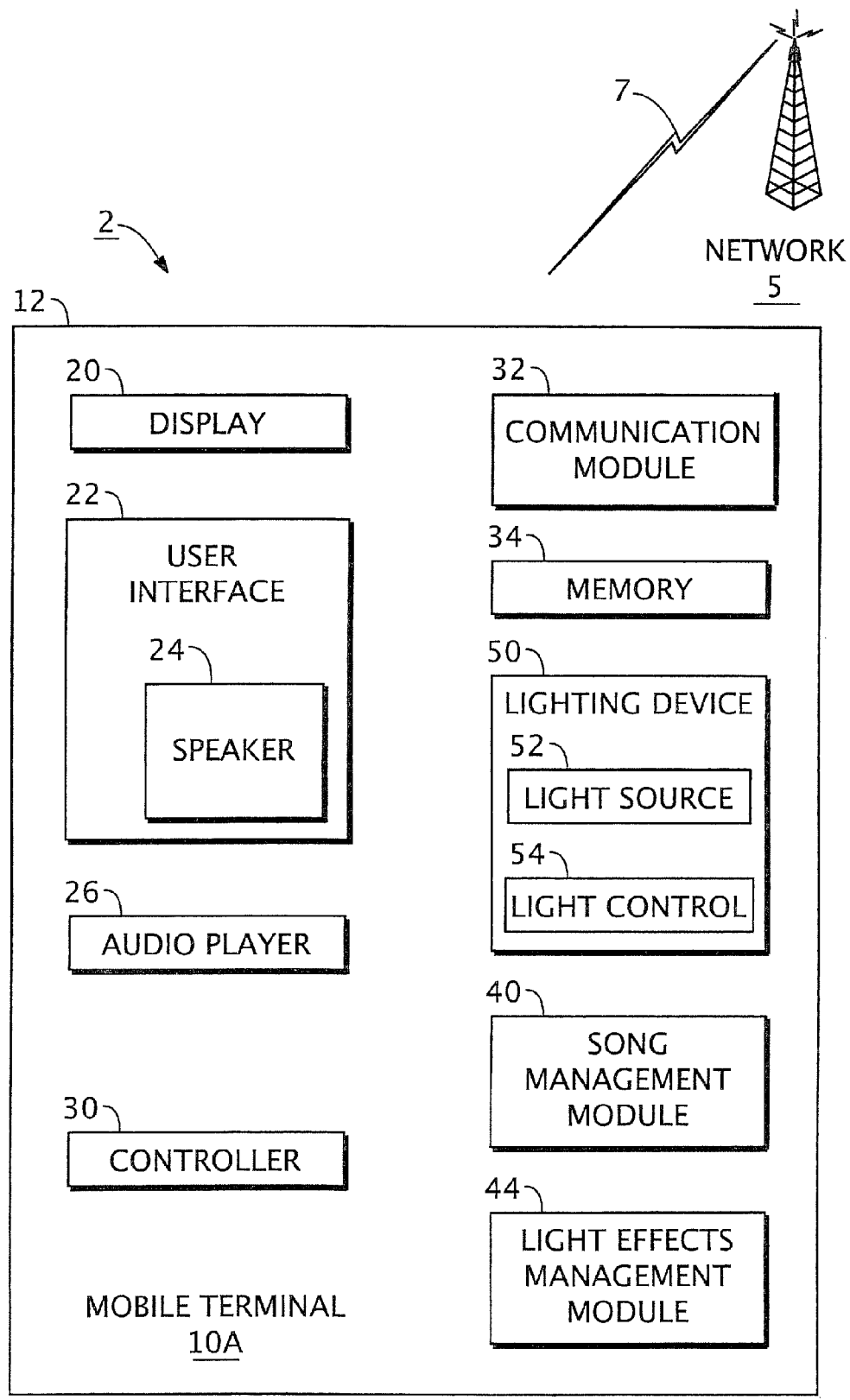
FIG. 1 is a schematic diagram of a mobile wireless communication terminal according to some embodiments of the present invention and an exemplary base station transceiver.

The present invention now will be described more fully with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

As used herein, the term "comprising" or "comprises" is open-ended, and includes one or more stated features, integers, elements, steps, components or functions but does not preclude the presence or addition of one or more other features, integers, elements, steps, components, functions or groups thereof.

As used herein, the term "and/or" includes any and all combinations of one or more of the associated listed items.

As used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation.

The terminology used herein is for the purpose of describing particular embodiments only and is not intended to be limiting of the invention. As used herein, the singular forms "a", "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Furthermore, "coupled" or "connected" as used herein may include wirelessly coupled or connected.

Well-known functions or constructions may not be described in detail for brevity and/or clarity.

The present invention may be embodied as methods, electronic devices, and/or computer program products. Accordingly, the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

Embodiments according to the present invention are described with reference to block diagrams and/or operational illustrations of methods and communication terminals. In this regard, each block may represent a module, segment, or portion of code, which comprises one or more executable instructions for implementing the specified logical function(s). It is to be understood that each block of the block diagrams and/or operational illustrations, and combinations of blocks in the block diagrams and/or operational illustrations, can be implemented by radio frequency, analog and/or digital hardware, and/or program instructions. These program instructions may be provided to a controller, which may include one or more general purpose processors, special purpose processors, ASICs, and/or other programmable data processing apparatus, such that the instructions, which execute via the controller and/or other programmable data processing apparatus, create means for implementing the functions/acts specified in the block diagrams and/or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language and/or a lower level assembler language. It will be further appreciated that the functionality of any or all of the program modules may also be implemented using discrete hardware components, one or more application specific integrated circuits (ASICs), or a programmed digital signal processor or microcontroller.

As used herein, "electronic component" means an active device as contrasted with a passive electrical connector or the like. An electronic component may include a processor.

As used herein, "streamed" or "streaming" means that a file, such as an audio or song file, is continuously sent via a digital signal to a receiving device where the audio or song file is concurrently played via a suitable receiving application. The digital signal is typically buffered.

As used herein, a "communication terminal" includes, but is not limited to, a terminal that is configured to receive/transmit communication signals via a wireline connection, such as via a public-switched telephone network (PSTN), digital subscriber line (DSL), digital cable, or another data connection/network, and/or via a wireless interface with, for example, a cellular network, a satellite network, a wireless local area network (WLAN), and/or another communication terminal.

When the communication terminal is configured to communicate over a wireless interface, it is referred to herein as a "wireless communication terminal" or a "wireless terminal." Examples of wireless terminals include, but are not limited to, a cellular telephone, personal data assistant (PDA), pager, and/or a computer that is configured to communicate data over a wireless communication interface that can include a cellular telephone interface, a Bluetooth interface, a wireless local area network interface (e.g., 802.11), another RF communication interface, and/or an optical/infra-red communication interface.

As used herein, "mobile terminals" may be portable, transportable, installed in a vehicle (aeronautical, maritime, or land-based), or situated and/or configured to operate locally and/or in a distributed fashion at any other location(s) on earth and/or in space.

Referring now to FIG. 1, an exemplary mobile wireless communication terminal 10A in accordance with some embodiments of the present invention is illustrated. The wireless terminal 10A is configured to communicate data with one or more other wireless terminals over a direct wireless communication interface therebetween, over another wireless communication interface through one or more cellular base stations, and/or over another wireless communication interface through a wireless local area network (WLAN) router.

The wireless terminal 10A may be a mobile radiotelephone forming a part of a radiotelephone communication system 2 as illustrated in FIG. 1. The system 2 includes the mobile wireless communication terminal 10A and a base station transceiver, which is part of a wireless communications network 5. In some embodiments of the present invention, the network 5 includes a base station transceiver that includes the radio transceiver(s) that define an individual cell in a cellular network and communicates with the mobile terminal 10A (via an interface 7) and other mobile terminals in the cell using a radio-link protocol. It will be understood that, in some embodiments of the present invention, many base station transceivers may be connected through, for example, a mobile switching center and other devices to define the wireless communications network 5.

The mobile terminal 10A in the illustrated embodiments includes a portable housing assembly 12, a display 20, a user interface 22 (i.e., a man machine interface (MMI)) including a speaker 24 (i.e., a sound transducer), an audio player 26, a controller 30, a communication module 32, a memory 34, and a lighting device 50. The foregoing components of the mobile terminal 10A may be included in many conventional mobile terminals and their functionality is generally known to those skilled in the art. The mobile terminal 10A further includes a song management module 40 and a light effects management module 44, which may be stored in the memory 34. The mobile terminal 10A is capable of processing and playing song files (e.g., MP3 files).

The display 20 may be any suitable display screen assembly. For example, the display screen 28 may be a liquid crystal display (LCD) with or without auxiliary lighting (e.g., a lighting panel).

The user interface 22 may include any suitable input device(s) including, for example, a touch activated or touch sensitive device (e.g., a touch screen), a joystick, a keyboard/keypad, a dial, a directional key or keys, and/or a pointing device (such as a mouse, trackball, touch pad, etc.). The speaker 24 generates sound responsive to an input audio signal. The user interface 22 can also include a microphone coupled to an audio processor that is configured to generate an audio data stream responsive to sound incident on the microphone.

The controller 30 may support various functions of the mobile terminal 10A. The controller 30 can be any commercially available or custom microprocessor, for example. In use, the controller 30 of the mobile terminal 10A generates a display image on the display 20. The controller 30 may control the audio player 26 and various other components of the mobile terminal 10A.

The memory 34 is configured to store digital information signals and data such as a digital audio signal and/or digital audio files.

The communication module 32 is configured to communicate data over one or more wireless interfaces (e.g., wireless interfaces 7, 112, 114, 116, 122, and 134 as discussed herein (FIGS. 1 and 3)) to another remote wireless terminal as discussed herein. The communication module 32 can include a cellular communication module, a direct point-to-point connection module, and/or a WLAN module.

With a cellular communication module, the wireless terminal 10A can communicate via the base station(s) of the network 5 using one or more cellular communication protocols such as, for example, Advanced Mobile Phone Service (AMPS), ANSI-136, Global Standard for Mobile (GSM) communication, General Packet Radio Service (GPRS), enhanced data rates for GSM evolution (EDGE), code division multiple access (CDMA), wideband-CDMA, CDMA2000, and Universal Mobile Telecommunications System (UMTS). The cellular base stations may be connected to a Mobile Telephone Switching Office (MTSO) wireless network, which, in turn, can be connected to a PSTN and/or another network.

A direct point-to-point connection module may include a direct RF communication module or a direct IR communication module. The direct RF communication module may include a Bluetooth module. With a Bluetooth module, the wireless terminal 10A can communicate via an ad-hoc network through a direct point-to-point interface.

With a WLAN module, the wireless terminal 10A can communicate through a WLAN (e.g., a router 120 (FIG. 3)) using a communication protocol that may include, but is not limited to, 802.11a, 802.11b, 802.11e, 802.11g, and/or 802.11i.

The communication module 32 can include a transceiver typically having a transmitter circuit and a receiver circuit, which respectively transmit outgoing radio frequency signals (e.g., to the network 5, a router or directly to another terminal) and receive incoming radio frequency signals (e.g., from the network 5, a router or directly to another terminal), such as voice and data signals, via an antenna. The communication module 32 may include a short range transmitter and receiver, such as a Bluetooth transmitter and receiver. The antenna may be an embedded antenna, a retractable antenna or any antenna known to those having skill in the art without departing from the scope of the present invention. The radio frequency signals transmitted between the mobile terminal 10A and the network 5, router or other terminal may include both traffic and control signals (e.g., paging signals/messages for incoming calls), which are used to establish and maintain communication with another party or destination. The radio frequency signals may also include packet data information, such as, for example, cellular digital packet data (CDPD) information. In addition, the transceiver may include an infrared (IR) transceiver configured to transmit/receive infrared signals to/from other electronic devices via an IR port.

The mobile terminal 10A may also be configured to electrically couple with another terminal via a wireline or cable for the transmission of digital communication signals therebetween. The mobile terminal 10A may include further components such as a camera device configured to generate a still image and/or video data stream based on incident light.

According to some embodiments, the mobile terminal 10A is a handheld mobile terminal. By "handheld mobile terminal," it is meant that the outer dimensions of the mobile terminal are adapted or configured and suitable for use by a typical operator using one hand. According to some embodiments, the total volume of the handheld mobile terminal 10A is less than about 200 cc. According to some embodiments, the total volume of the handheld terminal 10A is less than about 100 cc. According to some embodiments, the total volume of the handheld mobile terminal 10A is between about 50 and 100 cc. According to some embodiments, no dimension of the handheld mobile terminal 10A exceeds about 200 mm.

Figure 2:
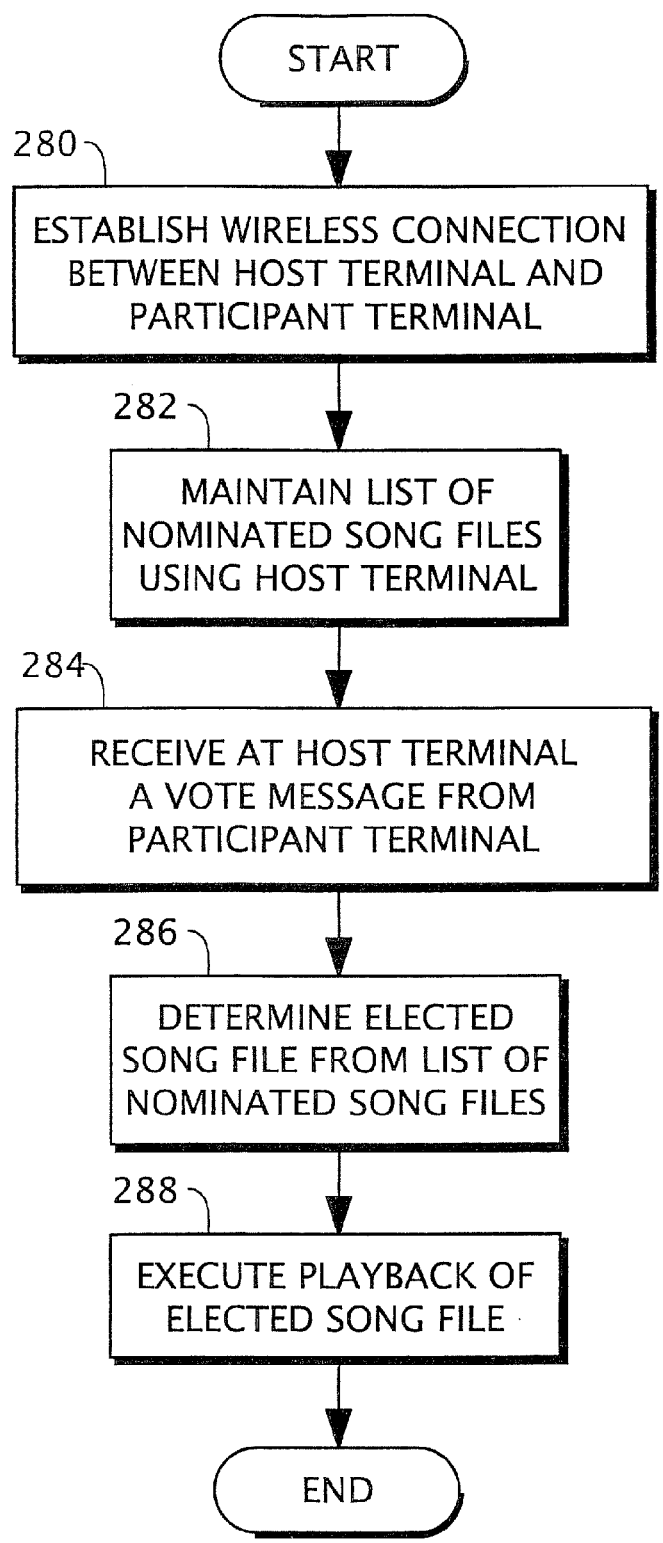
FIG. 2 is a flowchart illustrating methods in accordance with some embodiments of the present invention.

A method for selecting and playing back a song file using mobile wireless communication terminals (e.g., mobile terminals 10A-E) according to embodiments of the present invention will now be described in reference to the flowchart of FIG. 2. The method includes establishing a wireless connection between a host wireless communication terminal and at least one participant wireless communication terminal (Block 280). The host terminal maintains a list of nominated song files (Block 282). The host terminal receives at least one vote message from the at least one participant terminal (Block 284). The host terminal determines an elected song file from the list of nominated song files based on the at least one vote message (Block 286). The host terminal executes playback of the elected song file (Block 288). According to some embodiments, the host terminal also receives a song nomination from the at least one participant terminal and adds the song nomination to the list of nominated song files. The various method steps and operations as described herein for selecting and playing back nominated song files may be enabled and executed by the suitably configured controller 30 and song management module 40 of the implementing mobile terminal(s).

According to some embodiments, connections are established between the host wireless communication terminal and a plurality of participant wireless communication terminals, and the host wireless communication terminal receives a plurality of vote messages from the plurality of participant wireless communication terminals and determines the elected song based on the plurality of vote messages.

According to some embodiments, communication between the host wireless communication terminal and the participant wireless communication terminal is accomplished via a direct point-to-point interface, such as a Bluetooth wireless RF connection. According to some embodiments, communication between the host wireless communication terminal and the participant wireless communication terminal is accomplished via an indirect interface, such as through a WLAN or cellular-based system. Further aspects and embodiments of the present invention will be apparent from the following descriptions of further embodiments.

Figure 3:
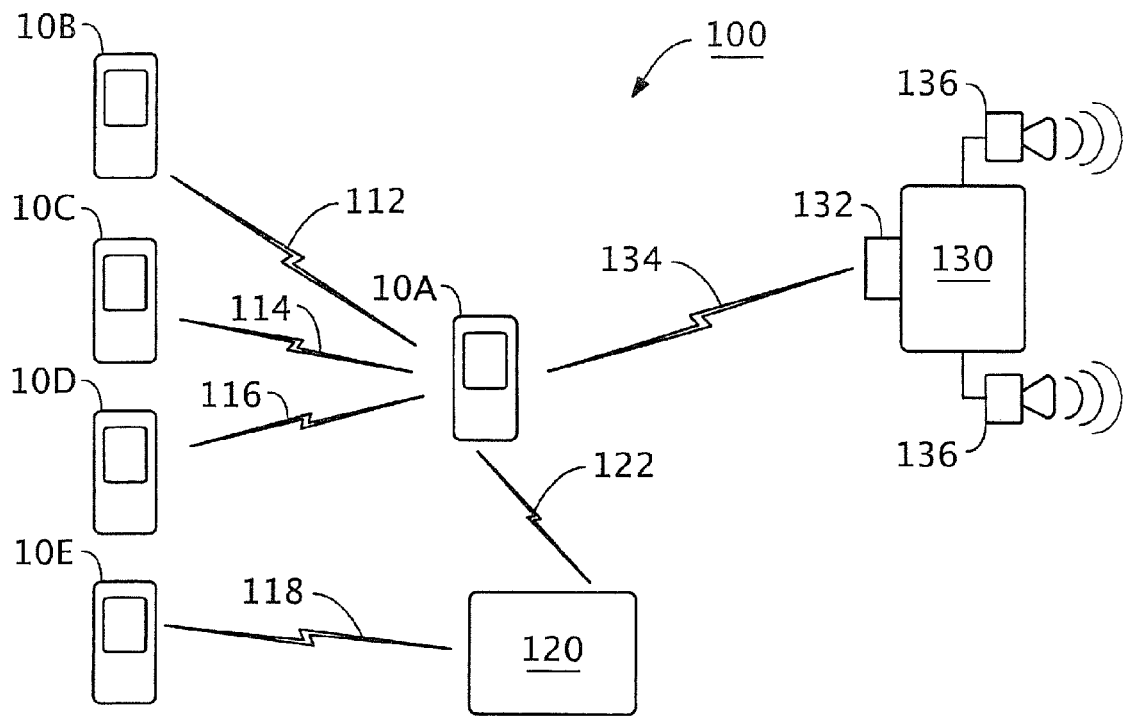
FIG. 3 is a schematic diagram of a song file playback system according to some embodiments of the present invention including the mobile wireless communication terminal of FIG. 1.

With reference to FIG. 3, an exemplary song file playback system 100A according to embodiments of the present invention is shown therein. The system 100A includes the mobile wireless communication terminal 10A (also referred to herein as the "host wireless communication terminal" or "host terminal"), a plurality of additional participant wireless communication terminals 10B, 10C, 10D, and 10E (also referred to herein as the "participant wireless communication terminals" or "participant terminals"), and a media center 130. The media center 130 includes apparatus adapted or configured to convert an audio signal (e.g., a digital audio signal) to corresponding sound. The media center 130 may include, for example, a PC or laptop, a television, an audio receiver, stereo equipment, etc. The illustrated media center 130 includes a wireless communication module 132 and sound transducers (speakers) 136. The wireless communication module 132 may be integrated with the media center 130 or may be an auxiliary or plug-in wireless communication module such as the Bluetooth Media Viewer MMV-100 module or Bluetooth Media Viewer MMV-200 module, each available from Sony Ericsson of Sweden. The terminals 10B-E may be configured as described above with regard to the terminal 10A. The terminals 10B-E each include a wireless communication module 32 and a song management module 40. However, the respective song management modules 40 may be differently configured for each terminal 10A-E depending on the intended functionality of the device. According to some embodiments, all or some of the terminals 10B-E are mobile wireless communication terminals. According to some embodiments, all or some of the terminals 10A-E are handheld mobile wireless communication terminals.

Figure 4:
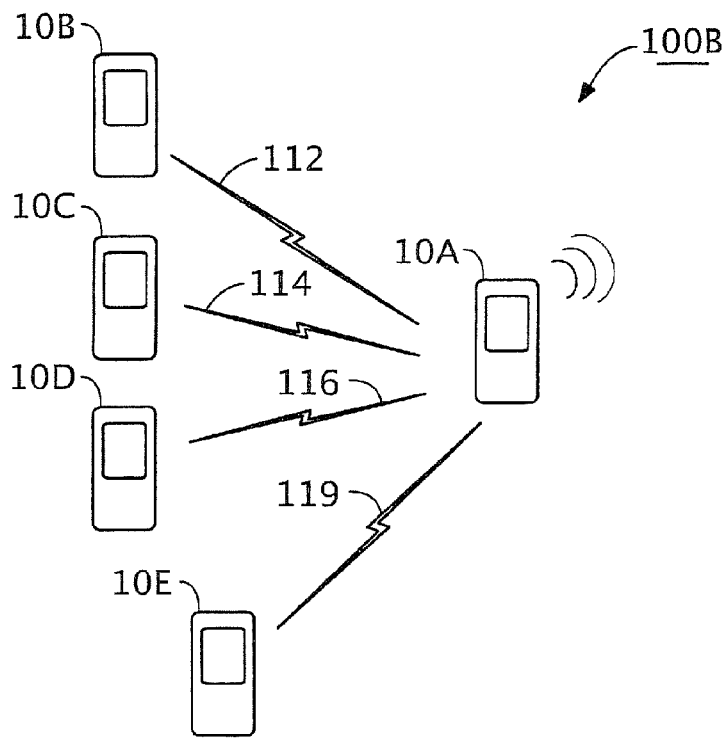
FIG. 4 is a schematic diagram of a song file playback system according to further embodiments of the present invention including the mobile wireless communication terminal of FIG. 1.

Referring now to FIG. 4, a further exemplary system 100B according to embodiments of the present invention is shown therein including the host terminal 10A and the participant terminals 10B-E. The system 100B differs from the system 100A (FIG. 3) in that the media center 130 is omitted and playback of the song files from the song play list 156 is conducted via the speaker 24 of the host terminal 10A.

Figure 5:
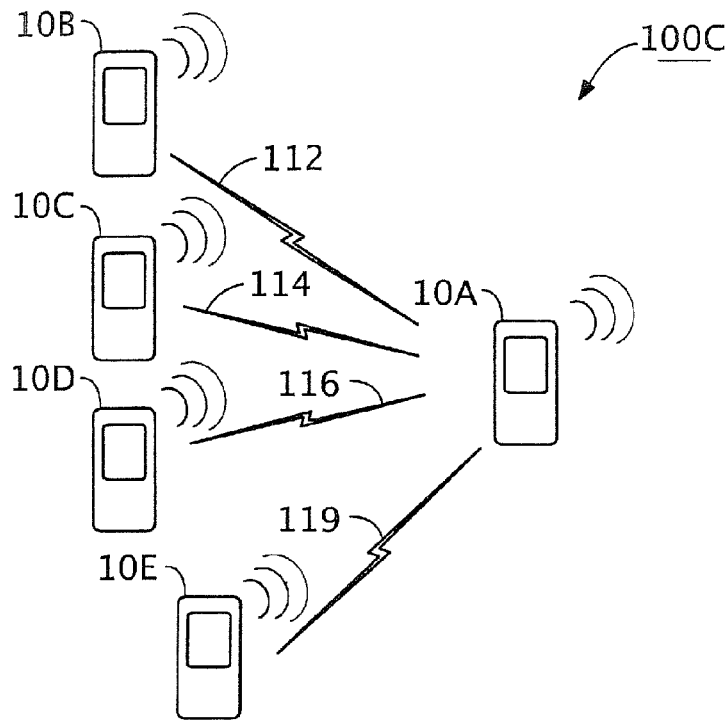
FIG. 5 is a schematic diagram of a song file playback system according to further embodiments of the present invention including the mobile wireless communication terminal of FIG. 1.

Referring now to FIG. 5, a further exemplary system 100C according to embodiments of the present invention is shown therein including the host terminal 10A and the participant terminals 10B-E. The system 100C differs from the system 100B (FIG. 5) in that playback of the song files from the song play list 156 is conducted via the speaker 24 of the host terminal 10A and, additionally, through the respective speakers of the participant terminals 10B-E and/or through one or more headsets (e.g., in-ear stereo headsets) operatively connected to the terminals 10A-E. More particularly, the controller 30 of the host terminal 10A plays each song file thereon and also sends the song file to the participant terminals 10B-E for simultaneous playback. According to some embodiments, the playback is synchronized between the mobile terminals 10A-E.

Various combinations and aspects of the exemplary systems 100A, 100B, 100C may be employed and the host terminal 10A may be configured to allow the user to selectively choose the device or combination of devices for playback from the various options discussed above. For example, the host terminal 10A may be configured to execute playback via only the speaker 24 of the host terminal 10A, via the speakers of the participant terminals 10B-E but not the host terminal 10A, via the speakers of the participant terminals 10B-E and the media center 130, etc. It will be appreciated that, when the song files are played back via the speakers of the terminals 10A-E, the user of a given one of the participant terminals may disable the speaker thereof and/or may relay the song file for playback on another device (e.g., an associated further media center or the like).

Mobile terminals, methods and systems in accordance with embodiments of the present invention will now be described using an illustrative example of use. The host terminal 10A is chosen to be the master or host terminal and the participant terminals 10B-E are each designated as slave or participant terminals. The controller 30 of the host terminal 10A establishes a wireless connection (i.e., communicatively couples) with each of the participant terminals 10B-E. According to some embodiments, the wireless connection is a direct wireless communication interface connection, according to some embodiments, a direct RF connection and, according to some embodiments, a Bluetooth connection. The connections may be established in known manner. For example, in the case of Bluetooth connections, the participant (slave) terminals 10B-E may be set to a searchable/discoverable state and the host (master) terminal 10A emits an inquiry to identify the available participant (slave) terminals 10B-E to form a piconet or personal area network.

As illustrated, in the system 100A (FIG. 3) the host terminal 10A communicates with the participant terminals 10B, 10C and 10D via direct point-to-point wireless interfaces or links 112, 114 and 116, respectively, and with the participant terminal 10E via wireless interfaces or links 118, 122 through a WLAN router 120. In the systems 100B (FIG. 4) and 100C (FIG. 5), the host terminal 10A communicates with the participant terminals 10B-E via direct point-to-point links 112, 114, 116, 119. In the case of the system 100A, the host terminal 10A is also communicatively coupled to the media center 130 to provide wireless song data signals via a wireless interface or link 134 to the communication module 132. Alternatively, the host terminal 10A can be connected to the media center 130 using a wireline or signal cable. It will be appreciated that, according to some embodiments, the interfaces may be various combinations of wireless interfaces that are direct (e.g., Bluetooth) or indirect (e.g., via a WLAN router or a cellular network 5). According to some contemplated embodiments, all of the signals provided between the host terminal 10A and the participant terminals 10B-E to execute the song sharing procedure are provided via direct point-to-point wireless interfaces. According to some contemplated embodiments, all of the signals provided between the host terminal 10A and the participant terminals to execute the song sharing procedure are provided via direct wireless radio frequency (RF) interfaces such as Bluetooth interfaces.

Before or after establishing the connections, the host terminal 10A may identify and designate valid participant terminals by any suitable method. According to some embodiments, the host terminal 10A will poll or send an invitation to all or a selected group of potential participant terminals (e.g., those within operational range of the host terminal's Bluetooth signal). The potential participant terminals may then opt in by replying with an acceptance of the invitation. Alternatively or additionally, the host terminal 10A may accept unsolicited requests from participant terminals to participate. The host terminal 10A may be used to define specific groups such as a listing of the potential participant terminals that will be permitted to participate (e.g., to contribute song nominations and/or votes).

Each song management module 40 provides a display 150 on the associated terminal 10A-E as shown in FIG. 4. The display provided on the host terminal 10A may differ from the display provided on the participant terminals 10B-E. For example, the portions of the display 150 related to management functionality may be omitted from the participant terminal displays. Alternatively, the song management module 40 may provide no display on the participant terminals 10B-E.

Figure 6:
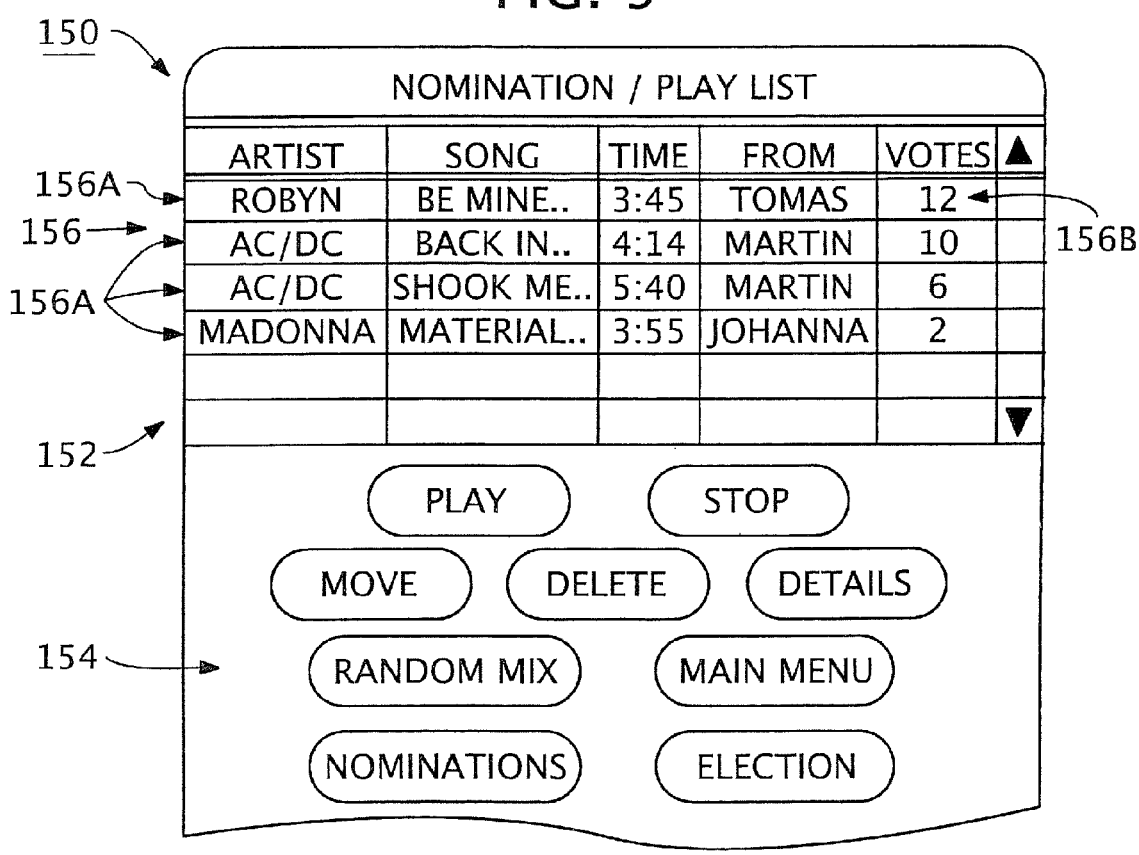
FIG. 6 is a schematic diagram illustrating a display of the mobile wireless communication terminal of FIG. 1 in accordance with some embodiments of the present invention.

Once the connections are established between the host terminal 10A and the participant terminals 10B-E, the host terminal 10A may send a request to the participant terminals 10B-E for song file nominations. For example, the host may actuate a "NOMINATIONS" button (FIG. 6) on the display 150. Each participant may use his or her respective participant terminal to send a nominee song identification to the host terminal 10A. The nominee song identification designates a song file the participant wishes to add to the nominated song list. The nominee song identification may designate a song file stored on the participant's terminal 10B-E. The song management module 40 of the sending participant terminal 10B-E may provide a user interface to facilitate the selection and sending of the nominee song identification(s). For example, the module 40 may generate a list of the available stored songs and check boxes for selecting the song(s) to send to the host terminal 10A. Additionally or alternatively, the nominated song list may comprise song identifications designating song files stored on the host terminal 10A. According to some embodiments, only the host terminal 10A may nominate song files. According to some embodiments, the host terminal 10A and/or the participant terminals 10B-E can nominate song files stored on mobile terminals other than themselves. The nominated song files constitute the nominated song list.

The host terminal 10A receives the nominee song identifications from the participant terminals 10B-E. The song management module 40 of the host terminal 10A creates and maintains a host nominated song list of these song identifications. The host nominated song list represents song files that are candidates to be played.

According to some embodiments, the host terminal 10A compiles the nominated song list and sends the nominated song list to the participant terminals 10B-E for display thereon. According to some embodiments, each of the participant terminals 10B-E receives nominations from other participant terminals (and, if applicable, the host terminal 10A) and itself compiles and displays the nominated song list.

In the illustrated embodiment, the display 150 includes a play list field 152 and control buttons 154 (e.g., soft keys). The control buttons 154 will typically only be displayed on the host terminal display. The nominated song list 156 is displayed in the play list field 152. The nominated song list 156 includes a row-by-row series of song identifications 156A, each corresponding to a respective song file. As illustrated, each song identification includes a song artist, a song name, and a song play time corresponding to the associated song file, as well as an identification of the participant that has submitted the song identification as a nominee. It will be appreciated that more less and/or different information An may be provided as well. A vote counter field 156B may also be provided for each nominated song identification 156A.

The host may initiate an election by actuating an "ELECTION" button (FIG. 6) on the display 150, for example. The election may be initiated for a single selected song, for a slate of songs less the full nominated song list, or for a slate including all of the nominated songs. The participants can vote on the nominated song(s) using their mobile terminals 10B-E. The votes are sent as vote messages by the participant terminals 10B-E to the host terminal 10A. The host may also be enabled to vote using his or her mobile terminal 10A. The host terminal 10A counts or tallies the vote messages and determines the "winning" or "elected" song file or files (i.e., the nominated song file or files receiving the most votes).

In some cases, only a single song file is elected for playback. In other cases, a plurality of nominated song files may be elected and placed in a play list in vote rank order for playback. According to some embodiments, the host terminal 10A may originally configure a play list that is thereafter reordered by voting of the participant terminals 10B-E (and, optionally, the host terminal 10A).

The host may selectively manage play of the songs represented by the song list 156 using the control buttons 154, for example. For example, the "PLAY" and "STOP" buttons may be used to start and stop transmission of the song files to the media center 130 and/or the audio players of the mobile terminals 10A-E. The "MOVE" button may be used to prioritize or change the order of the song identifications 156A in the play list 156 (i.e., to change the order in which the associated song files will be played). The "DELETE" button may be used to delete a song identification 156A from the play list 156. The "DETAILS" button may be used to delete a song identification 156A from the play list 156 so that the associated song file will not be played. The "RANDOM MIX" button may be used to cause the host terminal 10A to execute playback of the song files (i.e., send the song files to the media center 130) in a random or other non-sequential order. Typically, the host terminal 10A will execute playback of the song files in the listed sequence unless the random or other non-sequential mode is in effect.

When the host terminal 10A is in play mode, the controller 30 of the host terminal 10A will identify the elected song identification 156A that is to be played. The host terminal 10A will then execute playback of the elected song file. The host terminal 10A may execute playback by any suitable method.

According to some embodiments, the host terminal 10A will execute playback of the elected song by sending a song file request to the participant terminal 10B-E that nominated the song identification to retrieve the song file corresponding to the song identification. The corresponding participant terminal will then send a copy of the identified song file (which is stored on the participant terminal) to the host terminal 10A. According to some embodiments, the participant terminal sends the song file to the host terminal 10A as a copy of the song file that is then temporarily stored on the host terminal 10A (e.g., in the memory 34). According to other embodiments, the participant terminal sends the song file to the host terminal 10A as a streaming song file. According to some embodiments, the request and song file signals between the host terminal and the participant terminal are sent wirelessly and, according to some embodiments, via a direct wireless RF connection such as Bluetooth.

The controller 30 of the host terminal 10A then executes playback of the retrieved song file by sending the song file to the media center 130 and/or the mobile terminals 10B-E. The song file may be stored on the media center 130 and/or the mobile terminals 10B-E for playback. Alternatively, the song file may be streamed to the media center 130 and/or the mobile terminals 10B-E, for example, as the song file is streamed from the originating participant terminal to the host terminal 10A. It may be preferable or necessary to stream the song file from the participant terminal to the host terminal and/or from the host terminal to the media center 130 and/or the mobile terminals 10B-E if the allocated memory space on the host terminal 10A is insufficient and/or storage of the song file on the host terminal 10A is prevented or illegal. According to some embodiments, the song file, whether streamed or stored in whole, will be automatically erased (i.e., without user intervention) from the host terminal 10A during or after playback.

Additionally or alternatively, the host terminal 10A may execute playback of the song file by instructing the participant terminal on which the selected song file is stored to play the selected song file and/or distribute the selected song file to other devices (e.g., the other mobile terminals 10A-E and/or the media center 130) for playback.

The controller 30 of the host terminal 10A may execute the foregoing steps for each song identification 156A in turn and automatically (i.e., without user intervention). As the host terminal 10A runs through the song list 156 in this fashion, the host may modify the play list 156 as desired. Also, according to some embodiments, the participant terminals 10B-E can add new nominated song identifications to the song list 156 and vote on the nominated songs as the controller 30 of the host terminal 10A runs through the play list 156. According to some embodiments, new participant terminals can join the group and submit nominee song identifications and votes as the host terminal 10A runs through the play list 156.

According to some embodiments, the host terminal may request nominations and/or only add to the nominated song list nominations of song files in a prescribed song file category or categories (i.e., song files having associated therewith appropriate metadata tags as described herein). For example, the host terminal may request and limit the nominated song list to song files bearing a "disco" metadata tag.

Various further modifications to the methods and apparatus may be made in accordance with embodiments of the present invention. According to some embodiments, some participant terminals can vote on nominated song files but cannot nominate song files. According to some embodiments, some participant terminals can nominate song files, but cannot vote on the nominated song files. According to some embodiments, some participant terminals can nominate and/or vote, but cannot play back the elected song files (i.e., do not receive the song file from the host terminal or the originating participant terminal). According to some embodiments, some participant terminals can play back the elected song files, but cannot nominate or vote.

Other functionality could also be provided. For example, the host terminal 10A may allow the user to change the order of the song identifications 156A according to one or more selected attributes (e.g., contributing participant, song length, etc.). The host terminal 10A may be configured to designate which of the participant terminals 10B-E are permitted to add song identifications to the play list 156. The participant terminals 10B-E may be enabled to edit or modify the song list 156 in addition to adding song identifications. In this case, the host terminal 10A may be configured to allow the host to select which of the participant terminals 10B-E are and are not authorized to modify the song play list 156 (i.e., enable and disable the play list edit capability of the participant terminals).

The mobile terminals, systems, and methods as described herein can provide a convenient and enjoyable mechanism for enabling a group of people to select and play back songs. The mobile terminals, systems, and methods can provide playback execution functionality and also allow the host terminal (and, in some cases, the participant terminals) to create, coordinate, control and/or manage a song play list. In practice, for example, partygoers can add songs from their own participant terminals to a nominated song list maintained on a host terminal (e.g., the party host's own mobile terminal). If their song is elected, when their song's turn arrives in the playback sequence, a copy of the song file will automatically be sent to the host terminal and played. Thus, the partygoer need not take any further action. When, in accordance with some embodiments, the request and song transfer signals are communicated between the host terminal and the participant terminal via a direct wireless connection (e.g., an RF interface such as a Bluetooth connection), the partygoer may simply place his or her participant terminal in a pocket or handbag. Participants may be added and removed as the procedure is executed. For example, when a participant leaves the Bluetooth range, his or her songs may be deleted from or moved down the play list.

Figure 7:
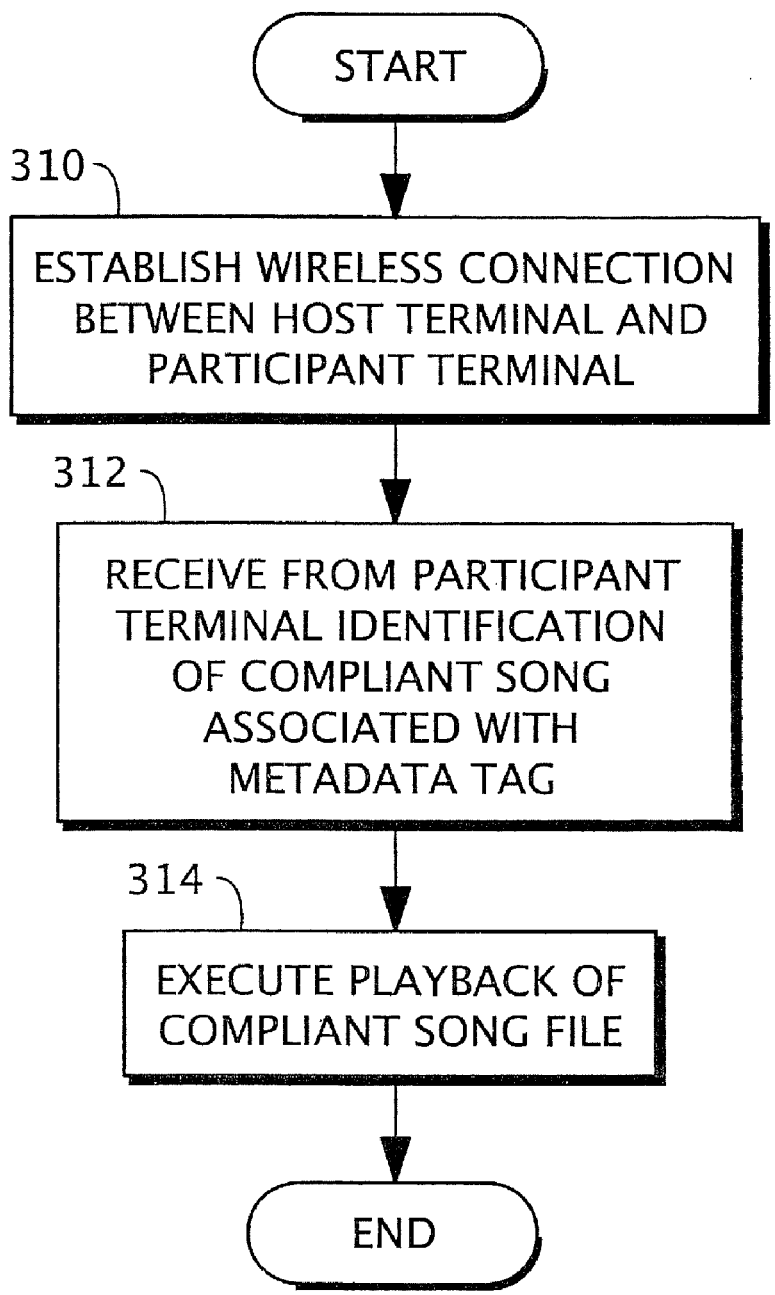
FIG. 7 is a flow chart illustrating methods in accordance with further embodiments of the present invention.

With reference to FIG. 7, according to further embodiments of the present invention, mobile wireless communications terminals, methods, systems and computer program products are provided that enable selection and playback of files according to prescribed classifications or categories. Such mobile wireless communication terminals, methods, systems and computer program products may be employed with voting functionality and/or light effects functionality as described herein or independently thereof. The mobile terminal, etc., may be configured as otherwise discussed above with reference to the mobile terminals 10A-E with suitable modifications to the song management module(s) 40 of the mobile terminals 10A-E to enable the mobile terminals 10A-E to function as described herein.

A method for selecting and playing back a song file using mobile wireless communications terminals (e.g., the mobile terminals 10A-E) according to some embodiments of the present invention will now be described with reference to FIG. 7. The method includes establishing a wireless connection between a he t wireless communication terminal and at least one participant wireless communication terminal (Block 310). The host terminal receives from the at least one participant terminal an identification of a song file that is stored on the at least one participant terminal and also has a metadata tag associated therewith that indicates the song file (with may be referred to a "compliant song file") is classified in a prescribed song file category (Block 312). The host terminal thereafter executes playback of the compliant song file (Block 314).

The various method steps and operations as described herein for selecting and playing back compliant song files may be enabled and executed by the suitably configured controller 30 and song management module 40 of the implementing mobile terminal(s) 10A-E.

According to some embodiments, the host terminal establishes a wireless connection with a plurality of participant wireless communication terminals, requests identification of compliant songs from the plurality of participant terminals, and executes playback of one or more of the compliant songs on the plurality of participant terminals.

According to some embodiments, the wireless connections is/are direct wireless communication interface connections, according to some embodiments, direct RF connections and, according to some embodiments, Bluetooth connections, as described herein. According to some embodiments, all of the signals provided between the host terminal and the participant terminal(s) to execute the compliant song identification procedure are provided via direct wireless RF interfaces such as Bluetooth interfaces. Similarly, according to some embodiments, the execution of playback of the compliant song files is accomplished by transferring the song files via direct wireless RF connections such as Bluetooth. More particularly, the communications between the terminals and song file transfers may be executed using the various apparatus methods and techniques described above with regard to the playlist management and playback function.

According to more particular embodiments, a host terminal 10A is designated and the controller 30 of the host terminal 10A establishes wireless connections with one or more participant terminals such as the participant terminals 10B-E as described above. At least some of the participant terminals 10B-E have song files stored thereon. At least some of the participant song files include metadata tags assigned thereto. The metadata tag or tags correspond to some aspect of the associated song file by which the song file may be classified or categorized. Examples of aspects of song files and metadata tags are provided below.

The host terminal 10A selects or designates a song file category for playback. The designated category corresponds with a metadata tag or tags. The host terminal 10A sends a message to the participant terminals 10B-E requesting an identification of the song files on the participant terminals 10B-E that have the designated metadata tag associated therewith (i.e., the compliant song files).

The participant terminals 10B-E send response messages to the host terminal 10A each including a respective listing of song files stored on the respective responding participant terminal having the prescribed metadata tag. According to some embodiments, the participant can modify the reply list to include only a compliant song file or files that the participant wishes to offer.

The host terminal 10A selects or is used by the host to select a compliant song file from the compliant song file identifications received from the participant terminals 10B-E. The host terminal 10A may select the song file manually or according to further criteria (e.g., using the voting functionality described hereinbelow), for example. The selected song file may be added to a play list on the host terminal 10A if one is maintained.

The host terminal 10A then executes playback of the selected compliant song. The host terminal 10A may execute playback by any suitable method as those disclosed herein above with regard to the voting function. According to some embodiments, the host terminal 10A retrieves and plays the selected song file on its own speaker 24 and/or the host terminal 10A retrieves and distributes the selected compliant song file for playback on one or more of the participant terminals 10B-E and/or the media center 130, for example. According to some embodiments, the host terminal 10A distributes the compliant song file for simultaneous (and, optionally, synchronized) playback on a plurality of the participant terminals 10B-E. Additionally or alternatively, the host terminal 10A may instruct the participant terminal on which the selected song file is stored to play the selected song file and/or distribute the selected song file to another device (e.g., the other mobile terminals and/or the media center) for playback.

The host terminal 10A may request and/or accept song catalog listings from one or more participant terminals as discussed above. According to some embodiments, the song catalog listings include metadata tag data. The song file catalogs may include compliant and non-compliant song files. According to some embodiments, the host terminal controller 30 searches the received song catalogs to identify and list the compliant song files. The host terminal 10A may thereafter select a compliant song file for playback as described herein.

The metadata tag may take any suitable form and may be associated with the song files in any suitable manner. For example, the metadata tags can be embedded in, attached to or assigned to the song files by the originator of the song file (e.g., a party or entity such as a music media vendor which constructed or configured the song file prior to distribution of the song file to the participant terminal). The metadata tag may be assigned to the song file by the participant (e.g., using the participant terminal or otherwise).

As discussed above, the metadata tag indicates that the compliant song file is classified in a prescribed song file category. The prescribed song file category may be any suitable category. According to some embodiments, the metadata tag indicates that the song file includes a song of a particular genre (e.g., rock, techno, country/western, alternative country, disco, R&B, Hip Hop, World, Religious, Punk, Classical, Acoustic, Folk, etc.). According to some embodiments, the metadata tag indicates that the song file includes a song of a particular type (e.g., mood, meditation, light music, background music, etc.). According to some embodiments, the metadata tag indicates that the song file includes a song for a particular occasion or event (e.g., dance party, dinner party, birthday, wedding, graduation, etc.). According to some embodiments, the metadata tag indicates that the song file includes a song by a specified musician or artist (e.g., the compliant songs are all songs by The Beatles). According to some embodiments, the metadata tag indicates that the song file includes a song having a tempo in a particular range (e.g., slow, medium, fast). According to some embodiments, the metadata tag indicates that the song file includes a song that has received or is assigned a particular certification or rating (e.g., a "parental advisory" rating or, alternatively, a non-parental advisory rating). The metadata tag may indicate an operational or usage status of the song file. The operational or usage status may be determined by the actual use of the song file. By way of example and in accordance with some embodiments the metadata tag may indicate that a song file has previously won votes (as discussed herein, for example), has been played at least a prescribed number of times previously, or has been played less than a prescribed number of times (e.g., never been played back within a prescribed timeframe such as the current session). Thus, for example, a play list could be constructed of popular songs or songs that have never been played.

The search and selection criteria employed to identify and select compliant songs for playback may be suitably modified or augmented. Multiple search or request parameters can be set. For example, the host may request via the host terminal 10A an identification of all song files having both a "dance party" metadata tag and also a "non-parental advisory" metadata tag. By way of further example, the host may request via the host terminal 10A an identification of all song files having, in combination for each song file, a metadata tag indicating the song has not been played back in the current session, a "disco" metadata tag, and a metadata tag indicating the song file has received votes. The search or request parameters may indicate negative criteria, such as a request for all songs not having a "parental advisory rating" metadata tag.

Figure 8:
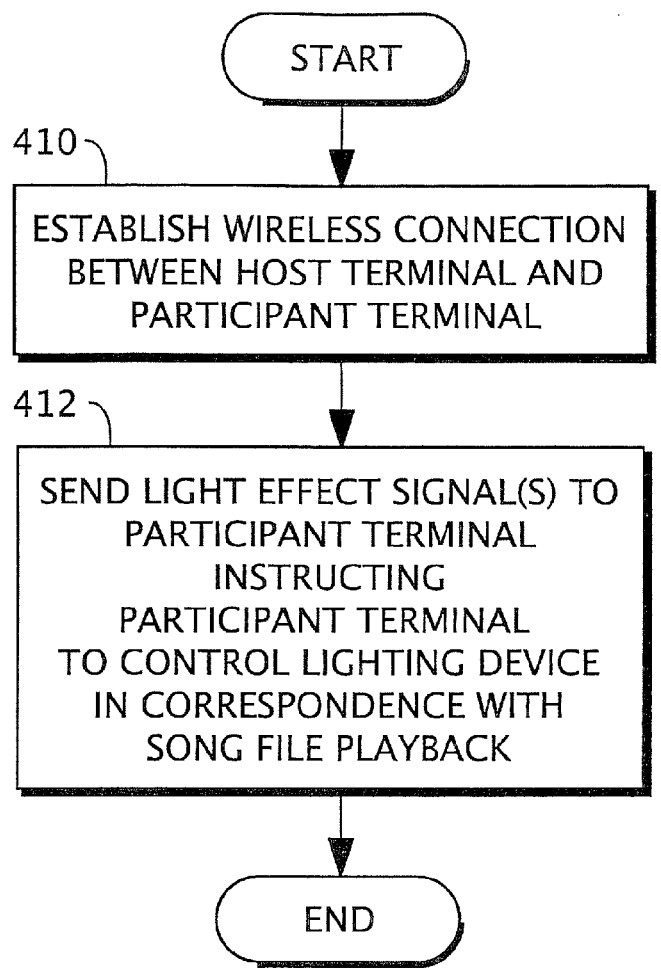
FIG. 8 is a flow chart illustrating methods in accordance with further embodiments of the present invention.

With reference to FIG. 8 according to further embodiments of the present invention, mobile wireless communications terminals, methods, systems and computer program products are provided that provide light effects corresponding to playback of a song file. In particular, the mobile terminals, methods, systems and computer program products may provide distributed light effects. Such mobile wireless communication terminals, methods, systems, and computer program products may be employed with the play list, metadata tag, voting or other functionality as described herein or independently thereof. The mobile terminal, etc., may be configured as otherwise described above with respect to the mobile terminals 10A-E with suitable modifications to enable the mobile terminals 10A-E to function as described herein.

A method for providing light effects on at least one participant wireless communication terminal and in correspondence with playback of a song file according to some embodiments of the present invention will now be described with reference to FIG. 8. The method includes establishing a wireless connection between a host wireless communication terminal and at least one participant wireless communication terminal (Block 410). The host wireless communication terminal sends at least one light effect signal to the at least one participant wireless communication terminal instructing the at least one participant wireless communication terminal to control at least one lighting device of the at least on participant wireless communication terminal in correspondence with playback of a song file (Block 412). The various method steps and operations as described herein for providing light effects may be enabled and executed by the suitably configured controller 30 and the light effects management module 44 (FIG. 1) of the implementing mobile terminals.

According to some embodiments, the host terminal establishes a wireless connection with a plurality of participant wireless communication terminals, and sends light effect signals to each of the plurality of participant terminals.

According to some embodiments, the wireless connection is/are direct wireless communication interface connections, according to some embodiments, direct RF connections and, according to some embodiments, Bluetooth connections, as described herein. According to some embodiments, all of the signals provided between the host terminal and the participant terminal(s) to execute the light effects thereon are provided via direct wireless RF interfaces such as Bluetooth interfaces. Similarly, according to some embodiments, the execution of playback of the song files is accomplished by transferring the song files via direct wireless RF connections such as Bluetooth. More particularly, the communications between the terminals and song file transfers may be executed using the various apparatus methods and techniques described above with regard to the playlist management and playback function.

Figure 9:
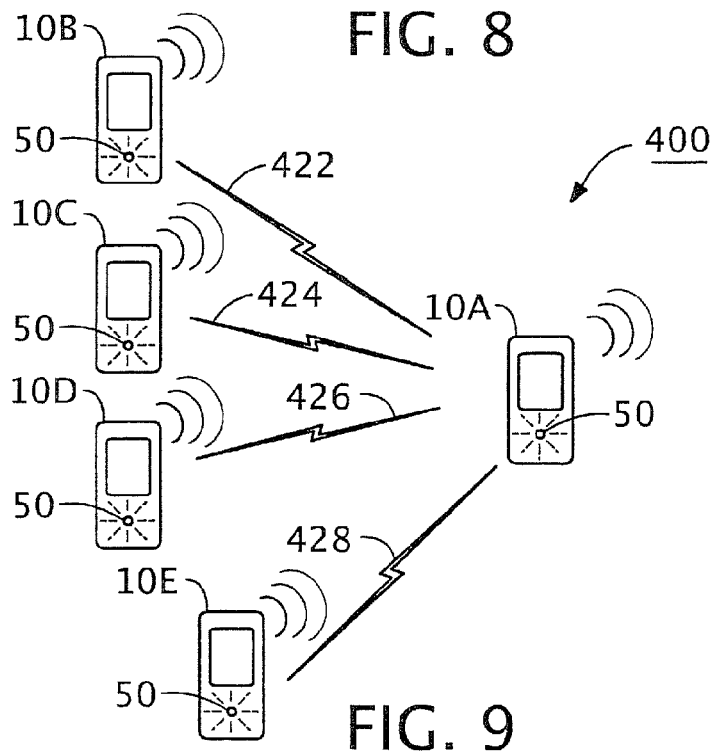
FIG. 9 is a schematic diagram of a song file playback system according to further embodiments of the present invention.

According to more particular embodiments and with reference to FIG. 9, there may be provided a system 400 including a host wireless communication terminal such as the mobile terminal 10A and one or more participant wireless communications terminals such as the mobile terminals 10B-E each having a respective lighting device or devices 50. According to some embodiments, multiple participant wireless communication terminals 10B-E are employed each having lighting devices 50. The host wireless communication terminal 10A may likewise include a lighting device 50. With reference to FIG. 1, each such lighting device 50 includes light source 52 and a light control 54 and is configured to selectively provide two different, mutually distinguishable light states. The light source 52 may include a suitable light source such as a light emitting diode (LED), a liquid crystal display (LCD), an incandescent lamp, or a phosphorescent material. For example, according to some embodiments, the light sources 52 include keypad LEDs and/or LCD displays of the mobile terminals 10A-E. The light control 54 is adapted to selectively control the lighting device 50. The light control 54 may itself be controlled by the controller 30 or the like of the associated terminal. The light control 54 may be an electrical switch or circuit capable of selectively actuating and deactuating the light source 52, or a moveable element such as a shutter or a lens. The at least two light states may include different light intensities (including on/off or varying (continuous or step wise) degrees of intensity) and/or different colors.

In use during playback of a song file from or via the host terminal 10A, the host terminal 10A sends light effect orders or signals 422, 424, 426, and 428 to each of the participant terminals 10B-E, respectively. The light effect signals embody or represent light control orders or instructions from the host terminal 10A. The light effect signals are dependent on, based on or correspond with the playback of the song file.

The participant terminals 10B-E receive the light effect signals 422, 424, 426, and 428 and the respective light controls 54 of the participant terminals 10B-E operate the associated light sources 52 in accordance therewith. Accordingly, the host terminal 10A governs the light effects displayed on the participant terminals 10B-E. For example, the light effect signals 422, 424, 426, and 428 from the host terminal 10A may cause the light sources 52 to turn on and off. According to some embodiments, the participant terminals 10B-E receiving the light effect signals 422, 424, 426, and 428 and displaying the light effects also simultaneously playback the audio of the song file. According to some embodiments, the accompanying audio signals trigger the light effects so that the light effects are synchronized and dependent on the audio signals.

The host terminal may dynamically control the light effects on a given participant terminal or may order or instruct the participant terminal to enter an appropriate mode after which the participant terminal's own controller 30 executes a corresponding light effects program. For example, the host terminal may send a series of light effect signals that directly order or cause the participant terminal to blink a light source 52 on and off. Alternatively, the host terminal may instruct the participant terminal to enter a mode wherein the participant terminal's light effect management module 44 causes its light source 52 to blink or the like in synchrony with the audio signal.

The light effects may be any suitable light actuation, modulation, display, etc. According to some embodiments, the light effects include blinking or pulsing of one more light sources 52 and, according to some embodiments, blinking or pulsing of one or more LEDs. According to some embodiments, the light effects include video or animation. In particular, the light effects may include video or animation displayed on the participant terminal's display 20 (e.g., an LCD). The video or animation may be generated from a video file pre-stored on the participant mobile terminal or a video file transmitted (e.g., streamed) from the host terminal 10A.

The host terminal 10A may also govern the distribution of light effects across the participant terminals 10B-E. According to some embodiments, the host terminal 10A sends different light effect signals to different participant terminals. Thus, over the course of playback of a given song file the light source 52 of the participant terminal 10B may turn on and off at different times than the light source 52 of the participant terminal 10C, for example. The host terminal 10A may thereby cause the participant terminals 10B-E to simultaneously display synchronized light effects in dynamic patterns that differ from one another. For example, the distributed light effects on the multiple mobile terminals may provide a disco light effect.

According to some embodiments, the host terminal sends light effect signals to one or more participant terminals that cause their lighting devices to actuate (e.g., pulse on and off) in response to audio frequencies of the song file in a first range (e.g., a high frequency range) and sends light effect signals to one or more other participant terminals that cause their lighting devices 50 to actuate (e.g., pulse on and off) in response to audio frequencies of the song file in a second range (e.g., low audio frequency range) different from the first range.

According to some embodiments, the host terminal causes the participant terminals to playback the song file in multi-channel audio with different audio channels being played on different participant terminals. For example, a first set of participant terminals (e.g., the participant terminals 10B and 10C) receive from the host terminal 10A and play back a first audio channel (e.g., a left stereo channel) of the song file, and a second set of the participant terminals (e.g., the participant terminals 10D and 10E) receive from the host terminal 10A and play back a second, different audio channel (e.g., a right stereo channel) of the song file. According to some embodiments, the light effect signals sent to the first set of participant terminals are paired with or correspond to the first audio channel and the light effect signals sent to the second set of participant terminals are paired with or correspond to the second audio channel. For example, the lighting devices 50 of the first set of participant terminals may blink in tempo or cadence with the first audio channel while the lighting devices 50 of the second set of participant terminals may blink in tempo or cadence with the second audio channel.

According to further embodiments, the multi-channel audio song file includes more than two audio channels and more than two separate channels are simultaneously respectively played back on different participant terminals. For example, the song file may be played back in a surround sound mode with three or more participant terminals playing different channels and displaying different corresponding light effects from one another.

According to some embodiments, the relative positions or locations of the host terminal and/or the participant terminals are determined and the host terminal assigns the light effects to the participant terminals in accordance with their relative locations. Any suitable techniques can be used to distribute audio channels and determine the relative spatial locations of the terminals. According to some embodiments, the multi-channel audio playback distribution is accomplished as described in Applicant's European Patent Application No. 04103212.9, filed Jul. 7, 2004, published as EP 1615464A1 on Jan. 11, 2006, the disclosure of which is incorporated herein by reference. Moreover, the relative positions of the host terminal and the participant terminals may be determined and utilized as described in European Patent Application No. 0403312.9. Additionally, calibration may be accomplished as described in European Patent Application No. 04033129 or using any other suitable techniques to compensate for radio link delays.

According to some embodiments, the light effects coordinated or governed by the host terminal 10A include a dynamic pattern that travels from mobile terminal to mobile terminal. For example, a light source (e.g., an LED or an LCD display) may be pulsed on each mobile terminal 10A-E in series so that the light pulse appears to travel along (e.g., up and down) a row of the mobile terminals 10A-E. To facilitate such operations, the relative spatial locations of the mobile terminals 10A-E may be determined as discussed above and the light effects assigned to the several mobile terminals 10A-E in accordance with their determined positions.

Figure 10A:
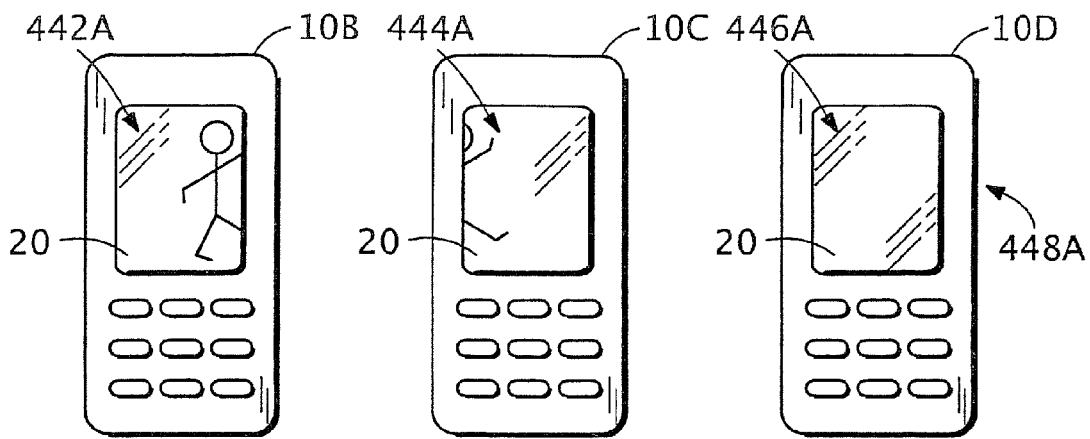
FIGS. 10A-C are schematic diagrams of a system according to embodiments of the present invention illustrating an animation sequence displayed on three mobile wireless communication terminals of the system.
Figure 10B:
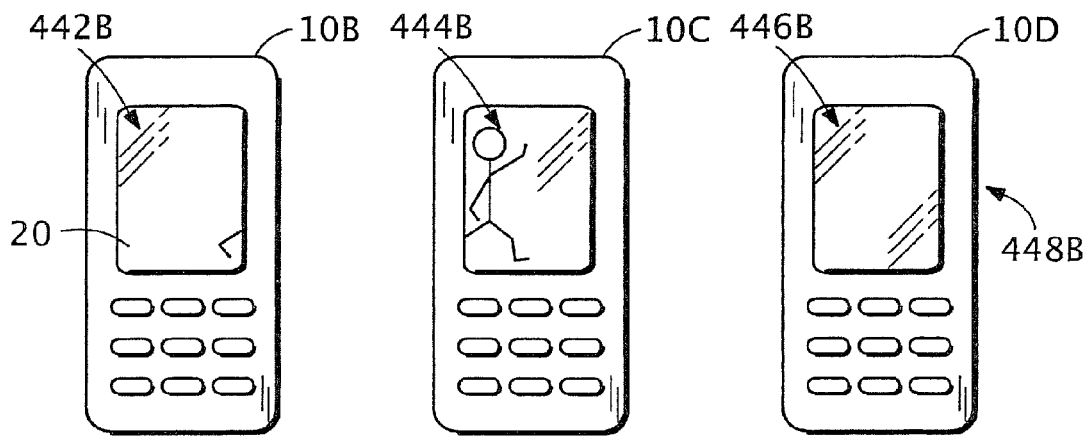
Figure 10C:
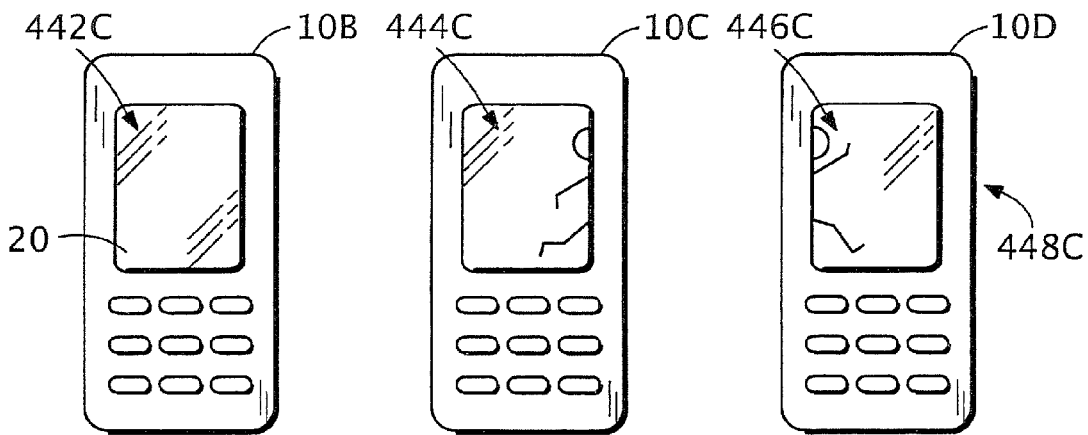

According to further embodiments, the dynamic patterned light effects include video or animation displayed on multiple mobile terminals 10A-E such that it appears to travel from display screen 20 (e.g., LCD) to display screen 20 of the mobile terminals 10A-E. For example, in FIG. 10A, three participant terminals 10B-D are shown having respective display screens 20 at a first point in time to provide a collective or combined image 448A. The displays 20 are controlled such that, at a later time, the respective images 442A, 444A, 446A are replaced with new images 442B, 444B, 446B as shown in FIG. 10B to provide a new combined image 448B, and, at a still later time, the images 442B, 44B, 446B are replaced with new images 442C, 444C, 446C to provide a new combined image 448C (FIG. 10C) giving the appearance that the objects in the combined images 448A, 448B, 448C have traveled over time along the displays 20 between the mobile terminals 10B-D. Thus, in the embodiment of Figures 10A-C, the light effects are distributed across the several mobile terminals 10B-D in a dynamic pattern that gives the impression of an animated person walking from display screen 20 to display screen 20 of the mobile terminals 10B-D. This operation may be paired with and facilitated by determining the relative spatial positions of the mobile terminals as discussed above.

The light effects as controlled by the host terminal may also include use of the screens or displays of multiple mobile terminals without screen-to-screen traveling animation. For example, the screens 20 may be used as a collective screen to display a still image.

Various of the invention embodiments disclosed herein can be used with or independently of other invention embodiments as disclosed herein. For example, a song file or song files may be selected for playback using the metadata tag procedure or voting procedure described herein, with the song files being played back one at a time without creation of a song file play list. According to some embodiments, the host terminal may only coordinate selection of song files for playback and instruct selected participant terminals to send song files (e.g., via streaming or as a complete file) to one or more playback device(s) (e.g., other participant terminals, the host terminal, or the media player) or to play the song file on the originating participant terminal only. According to some embodiments, the "host" status may shift among the mobile terminals 10A-E.

The application programs described herein, including the song management module 40 and the light effects management module 44, are illustrative of programs that implement various features according to embodiments of the present invention. It will be appreciated that other and/or additional application programs may be employed in accordance with embodiments of the present invention.

Although FIG. 1 illustrates an exemplary hardware/software architecture that may be used in mobile terminals and/or other electronic devices for management and playback of song files, it will be understood that the present invention is not limited to such a configuration but is intended to encompass any configuration capable of carrying out operations described herein. For example, although the memory 34 is illustrated as separate from the controller 30, the memory 34 or portions thereof may be considered as a part of the controller 30. More generally, while particular functionalities are shown in particular blocks by way of illustration, functionalities of different blocks and/or portions thereof may be combined, divided, and/or eliminated. Moreover, the functionality of the hardware/software architecture of FIG. 1 may be implemented as a single processor system or a multi-processor system in accordance with various embodiments of the present invention.

Many alterations and modifications may be made by those having ordinary skill in the art, given the benefit of present disclosure, without departing from the spirit and scope of the invention. Therefore, it must be understood that the illustrated embodiments have been set forth only for the purposes of example, and that it should not be taken as limiting the invention as defined by the following claims. The following claims, therefore, are to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

That which is claimed is:

1. A mobile wireless communication terminal comprising:
    a wireless communication module that is configured to communicate with other communication terminals over a wireless interface; and
    a controller that is configured to establish a connection with a plurality of participant wireless communication terminals via the wireless communication module, and to send light effect signals to each of the plurality of participant wireless communication terminals instructing each of the plurality of participant wireless communication terminals to control a lighting device thereof in correspondence with playback of a song file, wherein the controller is configured to send light effect signals to each of the plurality of participant wireless communication terminals instructing the plurality of participant wireless communication terminals to control the lighting devices thereof differently from one another;
    wherein the controller is configured to send light effect signals to each of the plurality of participant wireless communication terminals so as to cause a lighting device of a first of the plurality of participant wireless communication terminals to respond to audio signals in a first audio frequency range and to cause a lighting device of a second of the plurality of participant wireless communication terminals to respond to audio signals in a second audio frequency range different from the first audio frequency range.

2. The wireless communication terminal of claim 1 wherein the controller is configured to send light effect signals to each of the plurality of participant wireless communication terminals so as to cause the plurality of participant wireless communication terminals to display on respective displays thereof an image that moves over time from the display of a first of the plurality of participant wireless communication terminals to the display of a second of the plurality of participant wireless communication terminals.

3. The wireless communication terminal of claim 1 wherein the controller is configured to execute playback of the song file simultaneously on the plurality of participant wireless communication terminals.

4. The wireless communication terminal of claim 1 wherein:
    the wireless communication module is configured to communicate with other communication terminals over a direct point-to-point wireless interface; and
    the controller is configured to establish the connection with the at least one participant wireless communication terminal via the wireless communication module via the direct point-to-point wireless interface, and to send the at least one light effect signal to the at least one participant wireless communication terminal via the direct point-to-point wireless interface.

5. The wireless communication terminal of claim 1 wherein the wireless communication module comprises a Bluetooth transmitter.

6. The wireless communication terminal of claim 1 wherein the wireless communication terminal includes a cellular telephone.

7. A mobile wireless communication terminal comprising:
    a wireless communication module that is configured to communicate with other communication terminals over a wireless interface; and
    a controller that is configured to establish a connection with a plurality of participant wireless communication terminals via the wireless communication module, and to send light effect signals to each of the plurality of participant wireless communication terminals instructing each of the plurality of participant wireless communication terminals to control a lighting device thereof in correspondence with playback of a song file;
    wherein the controller is configured to coordinate control of the lighting devices of the plurality of participant wireless communication terminals using the light effect signals such that the lighting devices are operated differently from one another during playback of the song file by the plurality of participant wireless communication terminals.

8. The wireless communication terminal of claim 7 wherein the controller is configured to coordinate control of the lighting devices of the plurality of participant wireless communication terminals to execute a dynamic light effect pattern that travels from a first of the plurality of participant wireless communication terminals to a second of the plurality of participant wireless communication terminals.

9. The wireless communication terminal of claim 8 wherein the controller is configured to coordinate control of the lighting devices of the plurality of participant wireless communication terminals to cause a video or animation to be displayed on respective displays of the plurality of participant wireless communication terminals such that the video or animation appears to travel from the display of the first of the plurality of participant wireless communication terminals to the display of the second of the plurality of participant wireless communication terminals.

10. The wireless communication terminal of claim 7 wherein the controller is configured to coordinate control of the lighting devices of the plurality of participant wireless communication terminals so as to cause the plurality of participant wireless communication terminals to display on respective displays thereof an image that moves over time from the display of the first of the plurality of participant wireless communication terminals to the display of the second of the plurality of participant wireless communication terminals.

11. The wireless communication terminal of claim 7 wherein the controller is configured to coordinate control of the lighting devices of the plurality of participant wireless communication terminals using the light effect signals such that the lighting devices are operated differently from one another during simultaneous playback of the song file by the plurality of participant wireless communication terminals.

12. The wireless communication terminal of claim 7 wherein the controller is configured to send audio signals to each of the plurality of participant wireless communication terminals, and the audio signals trigger light effects from the lighting devices of the plurality of participant wireless communication terminals such that the lighting effects are synchronized and are dependent on the audio signals.

13. The wireless communication terminal of claim 7 wherein the lighting devices are light emitting diodes (LEDs), and the controller is configured to instruct the plurality of participant wireless communication terminals to turn the LEDs on and off.

14. The wireless communication terminal of claim 7 wherein the controller is configured to cause the plurality of participant wireless communication terminals to simultaneously display synchronized light effects in dynamic patterns that differ from one another during simultaneous playback of the song file on the plurality of participant wireless communication terminals, 15. The wireless communication terminal of claim 7 wherein:
   the controller is configured to cause a first of the plurality of participant wireless communication terminals to playback a first audio channel of the song file and to cause a second of the plurality of participant wireless communication terminals to playback a second audio channel of the song file;
   the light effect signals sent to the first of the plurality of participant wireless communication terminals correspond to the first audio channel; and
   the light effect signals sent to the second of the plurality of participant wireless communication terminals correspond to the second audio channel.

16. The wireless communication terminal of claim 7 wherein the controller is configured to:
   determine the relative positions of the plurality of participant wireless communication terminals; and
   assign different light effect signals to the plurality of participant wireless communication terminals dependent on their relative positions.

17. The wireless communication terminal of claim 7 wherein the controller is configured to:
   execute playback of the song file simultaneously on the plurality of participant wireless communication terminals; and
   coordinate control of the lighting devices of the plurality of participant wireless communication terminals using the light effect signals such that the lighting devices are operated differently from one another during simultaneous playback of the song file by the plurality of participant wireless communication terminals.

18. The wireless communication terminal of claim 7 wherein:
   the wireless communication module is configured to communicate with other communication terminals over a direct point-to-point wireless interface; and
   the controller is configured to establish the connection with the at least one participant wireless communication terminal via the wireless communication module via the direct point-to-point wireless interface, and to send the at least one light effect signal to the at least one participant wireless communication terminal via the direct point-to-point wireless interface.

* * * * *